United States Patent
Tan et al.

(10) Patent No.: US 11,652,513 B2
(45) Date of Patent: May 16, 2023

(54) WIRELESS RELIABILITY FOR DEVICES IN MOTION

(71) Applicant: Cisco Technology, Inc., San Jose, CA (US)

(72) Inventors: Wai-Tian Tan, Los Altos, CA (US); Robert E. Liston, Menlo Park, CA (US); Herbert M. Wildfeuer, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 17/445,290

(22) Filed: Aug. 17, 2021

(65) Prior Publication Data
US 2023/0054643 A1 Feb. 23, 2023

(51) Int. Cl.
*H04W 4/029* (2018.01)
*H04B 7/0413* (2017.01)
*H04L 1/00* (2006.01)

(52) U.S. Cl.
CPC ......... *H04B 7/0413* (2013.01); *H04L 1/0003* (2013.01); *H04W 4/029* (2018.02)

(58) Field of Classification Search
CPC ..... H04B 7/0413; H04W 4/029; H04L 1/0003
See application file for complete search history.

(56) References Cited

U.S. PATENT DOCUMENTS

| | | | |
|---|---|---|---|
| 9,858,637 | B1 | 1/2018 | Quach et al. |
| 2019/0278083 | A1 | 9/2019 | Mammou et al. |
| 2020/0064907 | A1* | 2/2020 | Luo ........................ A63F 13/211 |
| 2020/0160609 | A1 | 5/2020 | Vembar et al. |
| 2020/0234506 | A1 | 7/2020 | Yang et al. |

OTHER PUBLICATIONS

Lai et al., "Accelerometer-assisted 802.11 rate adaptation on mobile WiFi access," EURASIP Journal on Wireless Communications and Networking, Dated: May 2012.
X. Hou, J. Zhang, M. Budagavi, S. Dey, "Head and Body Motion Prediction to Enable Mobile VR Experiences with Low Latency," GLOBECOM'19, pp. 1-7.

* cited by examiner

*Primary Examiner* — Rahel Guarino
(74) *Attorney, Agent, or Firm* — Patterson + Sheridan, LLP (57) ABSTRACT

Techniques for improved wireless reliability are provided. Data is transmitted to a client device using a first set of retry parameters. It is determined that the client device is an augmented reality (AR) or virtual reality (VR) device, and a second set of retry parameters is determined, where the second set of retry parameters are more robust than the first set of retry parameters. Data is transmitted to the client device using the second set of retry parameters.

20 Claims, 9 Drawing Sheets

WIRELESS RELIABILITY FOR DEVICES IN MOTION

TECHNICAL FIELD

Embodiments presented in this disclosure generally relate to wireless reliability. More specifically, embodiments disclosed herein relate to improved wireless reliability for devices under motion.

BACKGROUND

Reliable wireless communication has become increasingly important in a wide variety of deployments, particularly when the client devices can move (e.g., laptop computers, mobile phones, and the like). Recently, wireless technologies have been used for augmented reality (AR) and virtual reality (VR) headsets or other devices. Such AR/VR devices differs from traditional mobile devices in several notable aspects, and parameters used for existing wireless communications often fail to perform reliably with such devices.

For example, AR and VR devices frequently undergo changing and, at times, haphazard motion due to head turns, body motions, and the like. This significant motion stands in stark contrast to other more traditional mobile devices (such as smartphones), which tend to be held relatively steadily even as the user moves. This rapid motion can significantly impact wireless reliability.

Further, the tightly-bounded round trip latency required by such AR/VR devices can pose a significant problem. While small lag spikes are often imperceptible in many more traditional devices, for AR/VR devices, low latency is needed to minimize or eliminate any perceived lag between user action and scene rendering. Current wireless implementations are not engineered with these considerations in mind, resulting in significantly reduced reliability and usability of wireless communications for such devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to one embodiment presented in this disclosure, a method is provided. The method includes transmitting data to a client device using a first set of retry parameters; determining that the client device is at least one of an augmented reality (AR) or a virtual reality (VR) device; determining a second set of retry parameters, wherein the second set of retry parameters are more robust than the first set of retry parameters; and transmitting data to the client device using the second set of retry parameters.

According to a second embodiment of the present disclosure, a computer product is provided. The computer product comprises logic encoded in a non-transitory medium, the logic executable by operation of one or more computer processors to perform an operation comprising: transmitting data to a client device using a first set of retry parameters; determining that the client device is at least one of an augmented reality (AR) or a virtual reality (VR) device; determining a second set of retry parameters, wherein the second set of retry parameters are more robust than the first set of retry parameters; and transmitting data to the client device using the second set of retry parameters.

According to a third embodiment of the present disclosure, a system is provided. The system comprises one or more computer processors; and logic encoded in a non-transitory medium, the logic executable by operation of the one or more computer processors to perform an operation comprising: transmitting data to a client device using a first set of retry parameters; determining that the client device is at least one of an augmented reality (AR) or a virtual reality (VR) device; determining a second set of retry parameters, wherein the second set of retry parameters are more robust than the first set of retry parameters; and transmitting data to the client device using the second set of retry parameters.

Example Embodiments

Embodiments of the present disclosure provide techniques for improved wireless reliability via selective use of enhanced transmission and retry parameters. In some embodiments, these enhanced parameters are used for devices characterized by significant motion, such as augmented reality (AR), virtual reality (VR), mixed reality (MR), and the like. In some embodiments, these devices are collectively referred to as AR/VR devices or extended reality (XR) devices.

Some embodiments of the present disclosure use remote-rendered AR/VR/MR, which involves generating the rendered frames (one for each eye, in some aspects) using one or more graphics processing elements (such as a desktop computer). These elements may be located near the user (e.g., a computer connected to the same local network), or remotely (e.g., in a cloud deployment).

In remote-rendered aspects, the rendered frames are transmitted to the headset as a pair of video streams for display. This architecture can allow for a significantly larger amount of graphics processing than is available in the headset itself, resulting in improved quality. However, remote-rendered AR/VR/MR demands a high level of network performance to avoid user experience issues such as glitches and stalls in the displayed video. Further, remote rendering can also demand low latencies from the network to ensure real-time reactions to changes in the user's physical space. Aspects of the present disclosure are readily applicable to both traditional AR/VR/MR (where the frames are rendered on the headset) as well as remote-rendered AR/VR/MR.

In many wireless networks (such as WiFi networks), remediation efforts for loss of connectivity are generally based on retransmissions and longer term tracking of modulation and coding schemes (MCS) and spatial streams. Generally, conventional retransmission efforts use relatively slow retry parameters (e.g., changing transmission parameters only a small amount after each failed retry). However, sudden movements and turns of AR/VR devices can often last only a small amount of time (e.g., a fraction of a second). Further, this motion is typically far faster than that seen in traditional mobile devices. Thus, even though the load on the network is not high, retransmission delays can reach significant levels (e.g., over 50 milliseconds) causing visible disruption if using traditional approaches.

In embodiments of the present disclosure, therefore, techniques are provided to selectively use enhanced transmission and/or retry parameters for AR/VR devices. These enhanced transmission configurations can rapidly and aggressively respond to losses in connectivity, significantly reducing the number of retransmissions that must be used (as well as the resulting overall latency spike). For example, rather than slowly changing the transmission parameters to be more robust (e.g., only a small amount for each failed retry), the system may change the parameters a larger amount after each failed retry to more rapidly move towards the most robust parameters possible. Further, in some embodiments, the AR/VR-specific transmission parameters can be used proactively to avoid retries in some cases. For example, based on the current network load or airtime usage, the system may determine to use the more robust parameters for all transmissions (rather than only for retries) to AR/VR devices.

Figure 1:
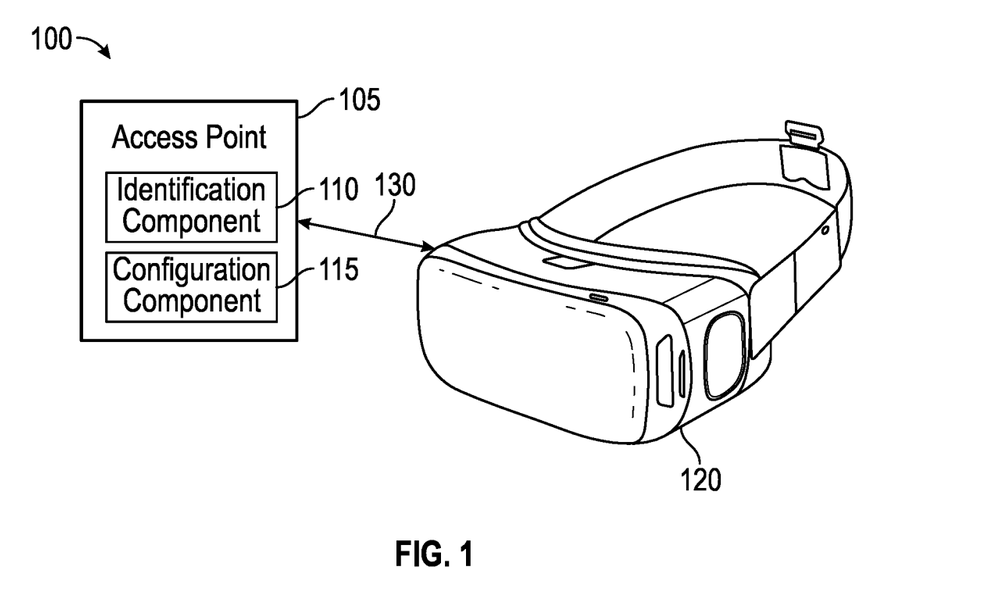
FIG. 1 depicts an example system configured to provide improved wireless communications, according to some embodiments disclosed herein.

FIG. 1 depicts an example system 100 configured to provide improved wireless communications, according to some embodiments disclosed herein.

In the illustrated example, an access point (AP) 105 is communicatively coupled with an AR/VR device 120 via a connection 130. In some embodiments, the AP 105 is configured to provide wireless connectivity (e.g., via a WiFi network) to the AR/VR device 120 (as well as other devices not pictured). Generally, the AR/VR device 120 outputs a rendered scene (e.g., via images or video) that is synchronized with the movement of the user in the physical space.

In some embodiments, the AR/VR device 120 transmits motion data (such as, for example, location and/or orientation information) to a computer or server (e.g., to a desktop that is also connected to the AP 105) via the connection 130. The computer can use this motion data to render one or more frames or images, which are returned to the AR/VR device 120 for output on the display. Thus, a significant amount of data may traverse the connection 130. Further, even minor latency (e.g., due to excessive retries) in this link can introduce obvious lag, where the apparent motion in the scene lags behind the actual motion of the user.

In the illustrated example, therefore, the AP 105 includes an identification component 110 and a configuration component 115 to implement aspects of the present disclosure. Though depicted as discrete components for conceptual clarity, in embodiments, the operations of the identification component 110 and configuration component 115 may be combined or distributed across any number of components. Further, though depicted as operating within the AP 105, in some aspects, the identification component 110 and/or configuration component 115 may be implemented on other devices, such as on a wireless controller device.

In an embodiment, the identification component 110 may be used to identify which device(s) connected to the AP 105 should be communicated with using the enhanced transmission and/or retry parameters. For example, the identification component 110 may classify each connected device based on its type (e.g., whether it is an AR/VR device).

Generally, the identification component 110 can use a variety of techniques to identify AR/VR devices. In some embodiments, a connected device may be explicitly labeled as an AR/VR device (e.g., through explicit configuration of the AP 105). For example, a user may specifically indicate that the device 120 is an AR/VR device (or should otherwise be treated using the enhanced parameters). In some embodiments, the AR/VR device 120 may identify itself as such using out-of-band signaling in packets transmitted to the AP 105.

In some embodiments, the identification component 110 evaluates historical metrics or characteristics of the devices to classify them. For example, based on historical traffic patterns, retry rates, motion or movement patterns of the device, and the like, the identification component 110 may determine whether each connected device is an AR/VR device. Some example techniques for device classification are discussed in more detail below with reference to FIG. 4.

In the illustrated embodiment, the configuration component 115 can determine and/or apply ordinary transmission and retry parameters, as well as enhanced transmission and retry parameters, based at least in part on the classification returned by the identification component 110. Generally, the modified/enhanced parameters are designed to increase transmission robustness and wireless reliability. Though the more aggressive AR/VR-specific parameters can improve reliability and robustness of the wireless signal, they may also reduce overall bandwidth of the link. In some embodiments, therefore, the system does not modify ordinary (e.g., non-retry) operations, as the AR/VR device motion tends to last only for short periods of time before returning to relatively steady state. That is, the system may use ordinary transmission parameters, and selectively use more aggressive transmission or retry parameters only when a failed transmission is detected.

Further, in some embodiments, the configuration component 115 applies the enhanced transmission and/or retry parameters only for devices that are identified as AR/VR, such that other (conventional) devices are communicated with using the ordinary or default retry schedule. This can preserve the efficiency and capacity of the network.

In various embodiments, the enhanced AR/VR-specific parameters can include application of a variety of techniques. For example, in some embodiments, the configuration component 115 may reduce the MCS index and/or number of spatial streams for transmissions to AR/VR device 120, turn off single user multiple input multiple output (SU-MIMO) techniques on the AP 105 for AR/VR devices 120, employ multi-antenna robustness mechanisms such as space-time block coding (STBC) or dual carrier modulation (DCM) techniques when communicating with AR/VR devices 120, perform additional sounding prior to attempted retransmissions to AR/VR devices, reduce the maximum number of allowable retries for AR/VR devices, and the like. Some example enhanced transmission and retry parameters are discussed in more detail below with reference to FIG. 3.

In some embodiments, in addition to (or instead of) using the enhanced parameters reactively (e.g., in response to transmission failures), the AP 105 can use proactive enhanced parameters. For example, in some embodiments, the AP 105 can evaluate the current state of the network (e.g., the amount of congestion and load). If the network state satisfies some defined criteria (e.g., a maximum load or amount of congestion), the AP 105 can selectively apply the robust transmission parameters for all transmissions to AR/VR devices (rather than only for retries). One example technique for this proactive enhancement is discussed in more detail below with reference to FIG. 6.

In some embodiments, the AP 105 can collect location and/or orientation information from the AR/VR device 120 (e.g., tracked using a gyroscope). By correlating historical transmission parameters and location or orientation data (e.g., identifying transmission parameters that led to successful transmission for a given location and/or orientation), the AP 105 may learn to improve its operations for future transmissions. For example, based on the current location and/or orientation of the AR/VR device 120, the AP 105 may look up and use the previously-successful transmission parameters to reduce the likelihood of a failed transmission. One example technique for this historical-based mapping is discussed in more detail below with reference to FIG. 7.

Figure 2:
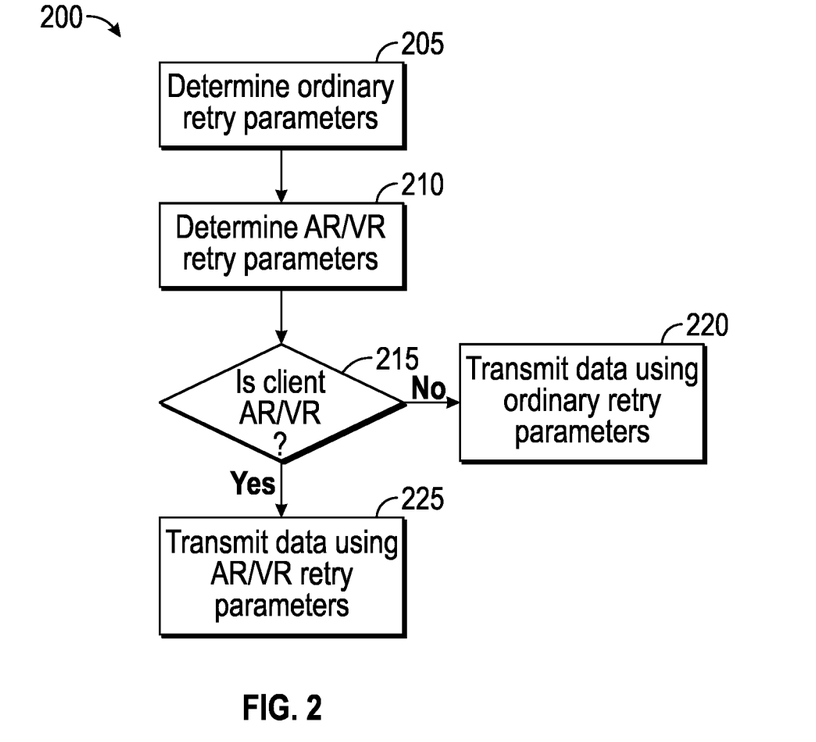
FIG. 2 is a flow diagram depicting a method for improving wireless reliability using enhanced retry parameters, according to some embodiments disclosed herein.

FIG. 2 is a flow diagram depicting a method 200 for improving wireless reliability using enhanced retry parameters, according to some embodiments disclosed herein.

The method 200 begins at block 205, where an AP (e.g., the AP 105 of FIG. 1) determines a set of ordinary retry parameters. This may include identifying a set of default retry parameters for communications (e.g., specified by a user or administrator). In some embodiments, the ordinary retry parameters can include, for example, a retry schedule indicating a sequence of MCS indices and/or numbers of spatial streams for retransmissions. For example, for initial transmissions, the AP may use a first MCS index (e.g., six) and a first number of spatial streams (e.g., two). In some embodiments, the retry schedule includes a sequence of values that are progressively more robust (e.g., reducing either the MCS index, number of spatial streams, or both) as the number of retries increases. For example, for the first retry, the AP may use an MCS index of five and two spatial streams. For a subsequent retry, the AP may use an MCS index of five with one spatial stream. Generally, decreasing the MCS index and number of spatial streams can increase robustness and reliability, while decreasing throughput. In various embodiments, the ordinary retry parameters may also include other factors such as whether SU-MIMO is enabled, a maximum number of retries, and the like.

At block 210, the AP can similarly determine a set of enhanced AR/VR-specific retry parameters. As discussed above, these enhanced parameters may generally be selected or specified (e.g., by the AP, or manually by a user) to more aggressively provide increased wireless reliability, as compared to the ordinary retry parameters. For example, the number of spatial streams and the MCS index may be reduced more rapidly (e.g., such that the most-robust parameters available are used for the third retry, rather than the twentieth). In some embodiments, the enhanced parameters may increase robustness at the expense of reduced bandwidth on the connection.

The method 200 then continues to block 215, where the AP determines whether a connected device is an AR/VR device, or otherwise satisfies some defined criteria used to determine whether to use the enhanced transmission/retry parameters. As illustrated, if the device is not an AR/VR device, the method 200 continues to block 220, where the AP transmits and receives data to and from the connected device using the ordinary retry parameters.

If, however, the AP determines that the connected device is an AR/VR device, the method 200 continues to block 225, where the AP transits and receives data to and from the device using the enhanced AR/VR retry parameters. In some embodiments, transmitting data using the AR/VR retry parameters includes transmitting data using ordinary transmission parameters when a retry is not needed (e.g., when there are no transmission failures). Upon detecting a failed transmission, however, the AP can immediately use the enhanced retry parameters to more aggressively attempt to transmit the lost data, as compared to the ordinary retry parameters. This can significantly increase the likelihood that the retransmission will be successful (and reduce the time needed to reach the successful transmission), thereby reducing interruptions in the link and increasing the wireless reliability of the system.

Figure 3:
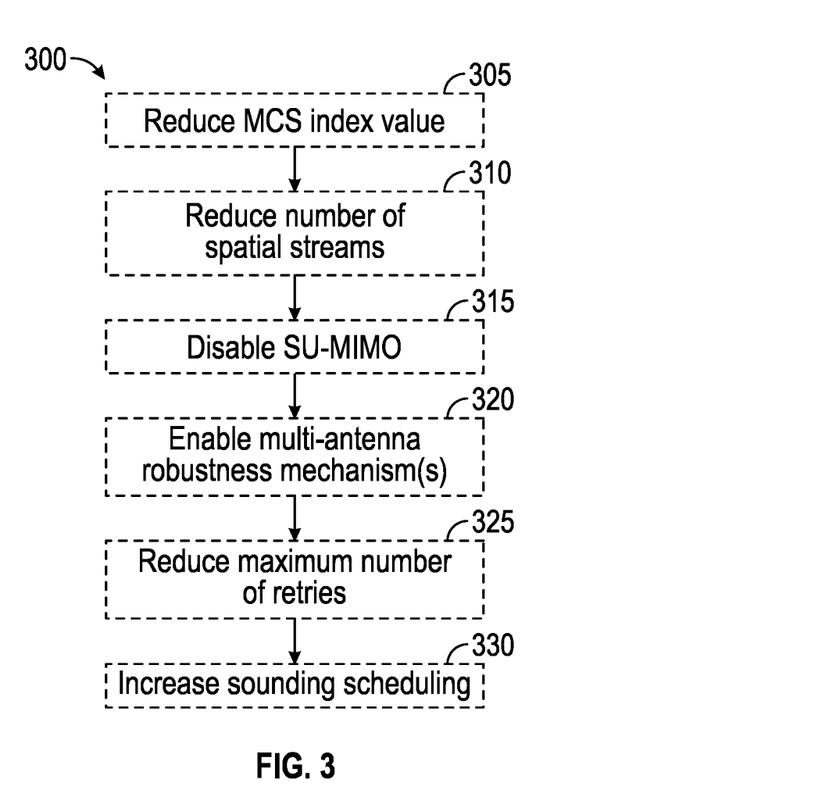
FIG. 3 is a flow diagram depicting a method for enhancing retry parameters to improve wireless reliability, according to some embodiments disclosed herein.

FIG. 3 is a flow diagram depicting a method 300 for enhancing retry parameters to improve wireless reliability, according to some embodiments disclosed herein. In some embodiments, the method 300 provides additional detail for block 210 of FIG. 2.

In the illustrated example, each block represents an optional element (illustrated using dotted lines) to enhance reliability of transmissions to connected devices. That is, depending on the particular implementation, an AP may use all or some subset of the enhancements. Further, in embodiments, other additional robustness-enhancements not discussed here may be used in accordance with the present disclosure. In some embodiments, a user or administrator can indicate which modifications should be used for the enhanced retry parameters.

The method 300 begins at block 305, where an AP (e.g., the AP 105 of FIG. 1) reduces the MCS index values of the retry schedule for AR/VR devices. For example, as discussed above, the AP may configure the AR/VR retry schedule to more aggressively reduce the MCS value for each failed retransmission, rather than the traditionally slow reduction (requiring many failed retransmissions) used in ordinary retry schedules.

At block 310, the AP can similarly reduce the number of spatial streams used for retransmissions to AR/VR devices. As discussed above, in a similar manner to the MCS index value, the AR/VR retry schedule may more aggressively reduce the number of spatial streams after each failed retransmission, in comparison to the traditionally slow reduction used for ordinary retry schedules.

At block 315, the AP can disable SU-MIMO for retransmissions to AR/VR devices. Generally SU-MIMO enables the AP to transmit multiple streams of data to (and receive multiple streams of data from) a single connected device simultaneously (e.g., using multiple antennas on each device). This can increase bandwidth, but may decrease reliability in some aspects (particularly when the device is moving rapidly). Thus, in the illustrated embodiment, the AP may determine to disable SU-MIMO for any retransmissions to AR/VR devices, which can enhance the reliability of the link and increase the likelihood of success.

At block 320, the AP can enable one or more multi-antenna robustness mechanisms for retransmissions to AR/VR devices. For example, the AP may determine to use STBC techniques to transmit multiple copies of the data (one copy sent via each of the available antennas) to increase the likelihood that the retry will succeed. Similarly, the AP may determine to use DCM techniques to enhance frequency diversity in the retransmission, thereby improving the wireless reliability.

At block 325, the AP may reduce the maximum number of retries that are permissible for AR/VR devices. In some embodiments, ordinary retry parameters can include a relatively high number of maximum retries, allowing the AP to attempt repeated retransmissions. However, these repeated retransmissions may require a significant amount of time, which introduces significant latency or lag to the connection. For AR/VR devices, this latency spike can significantly impact user experience. In contrast, a dropped frame may be less noticeable to the AR/VR user, as compared to a delayed frame. Thus, by reducing the maximum number of retries (e.g., to three), the AP can proceed quickly to the subsequent data (e.g., subsequent frames) when the retransmission continues to fail.

At block 330, the AP can increase the scheduling of sounding for AR/VR devices. Generally, sounding is used to evaluate the radio environment for wireless communications. The results of the sounding can be used to modify transmission parameters in an effort to enhance the reliability of subsequent transmissions. In conventional systems, channel sounding may be used relatively rarely. In the illustrated example, however, the AP may determine to initiate wireless sounding quickly (e.g., after a single failed transmission or retry), enabling the AP to quickly learn and respond to the current wireless environment. This can improve the likelihood that the subsequent retransmission will succeed.

As discussed above, in various embodiments, the AP may selectively use (or refrain from using) any reliability-enhancing techniques (as well as those not discussed here) in order to improve the likelihood of successful retransmissions (or original transmissions) for AR/VR devices.

Figure 4:
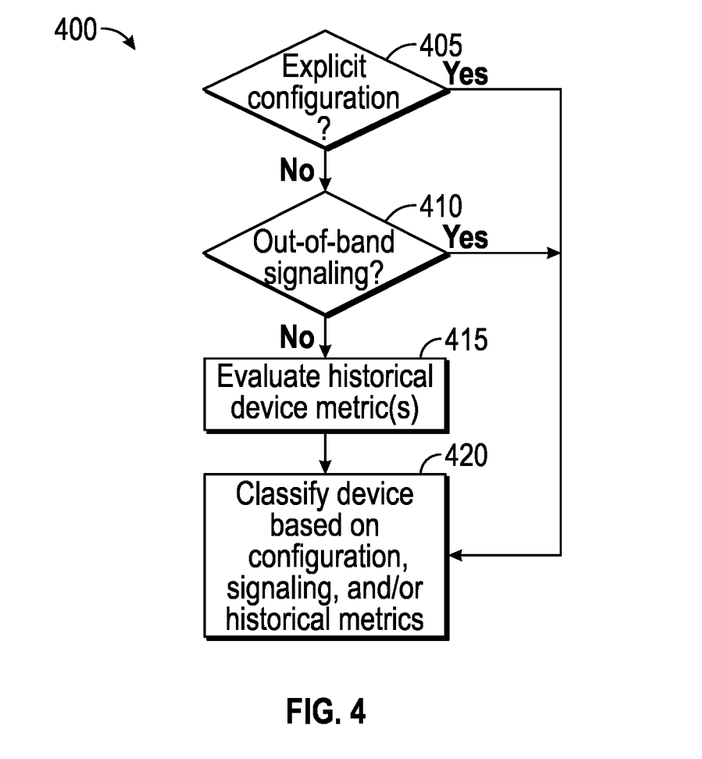
FIG. 4 is a flow diagram depicting a method for classifying client devices to improve wireless reliability, according to some embodiments disclosed herein.

FIG. 4 is a flow diagram depicting a method 400 for classifying client devices to improve wireless reliability, according to some embodiments disclosed herein. In some embodiments, the method 400 provides additional detail for block 215 of FIG. 2. Although depicted as a sequence of techniques to classify the device, in some aspects, the system may use all or some subset of the techniques (as well as other techniques not discussed herein) to classify connected devices.

The method 400 begins at block 405, where an AP (e.g., AP 105 in FIG. 1) determines whether the connected device is labeled as an AR/VR device through explicit configuration. For example, the user may label a connected device as an AR/VR device while configuring the AP.

If the connected device has been explicitly labeled as an AR/VR device, the method 400 continues to block 420, where the AP classifies the device as an AR/VR device. This enables the AP to use the enhanced transmission and/or retry parameters for the device.

Returning to block 405, if the AP determines that the device has not been explicitly configured or indicated as an AR/VR device, the method 400 continues to block 410. At block 410, the AP determines whether the connected device has indicated (e.g., in out-of-band signaling) that it is an AR/VR device. That is, some AR/VR devices may indicate, to the AP, that it is an AR/VR device. If the incoming data includes such an indication, the method 400 continues to block 420, where the AP can classify the device as an AR/VR device. As above, this allows the AP to use enhanced transmission and/or retry parameters when communicating with the device.

Returning to block 410, if the AP determines that the device has not indicated (e.g., using out-of-band signaling) that it is an AR/VR device, the method 400 continues to block 415. At block 415, the AP can retrieve and evaluate historical metrics and characteristics of the connected device. For example, as discussed above, the AP may evaluate historical traffic patterns, retry rates, motion of the device, and the like. The method 400 then continues to block 420, where the AP classifies the device based on these historical metrics. For example, if the AP determines that the device appears to frequently move quickly (in a similar manner to an AR/VR headset), the AP may classify it as an AR/VR device, even absent explicit configuration or out-of-band indications.

Figure 5:
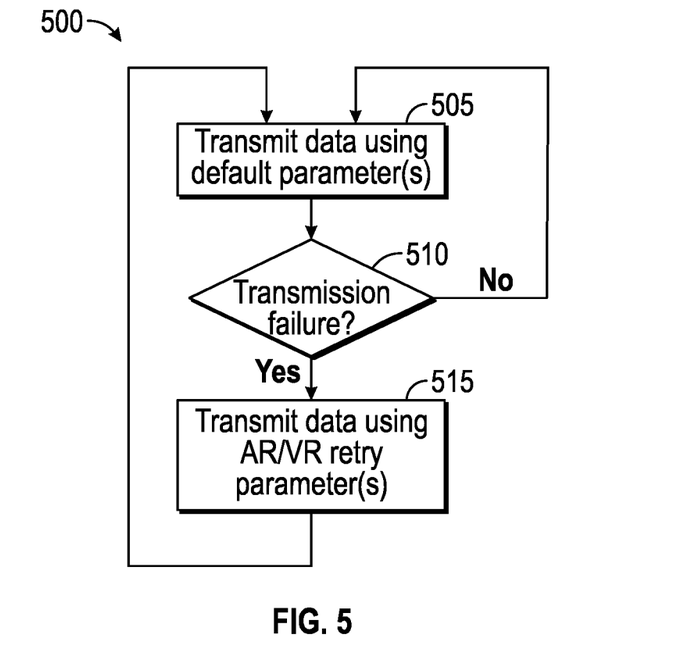
FIG. 5 is a flow diagram depicting a method for improving wireless reliability using updated retry parameters, according to some embodiments disclosed herein.

FIG. 5 is a flow diagram depicting a method 500 for improving wireless reliability using updated retry parameters, according to some embodiments disclosed herein. In some embodiments, the method 500 provides additional detail for block 225 of FIG. 2.

The method 500 begins at block 505, where an AP (e.g., AP 105 of FIG. 1) transmits data to an AR/VR device (e.g., AR/VR device 120) using the default or ordinary transmission parameters. That is, in the illustrated example, the AP can use default parameters if no transmission failures are detected. This can enable higher bandwidth to the AR/VR device (and other devices) when the connection is steady and reliable.

At block 510, the AP determines whether there has been a transmission failure. For example, the AP may determine whether one or more packets, transmitted to the AR/VR device, were not received. If no failure is identified, the method 500 returns to block 505. In this way, the AP can communicate with the AR/VR device using default transmission parameters while the connection remains stable.

If, at block 510, the AP determines that a failure has occurred (and thus that a retry or retransmission is needed), the method 500 continues to block 515. At block 515, the AP attempts to retransmit the data using the enhanced AR/VR retry parameters. As discussed above, this can include using a lower MCS index and/or number of spatial streams, disabling SU-MIMO, enabling STBC, performing additional channel sounding, and the like.

Once the data is successfully retransmitted, the maximum number of retries has been met, or the channel is otherwise stable, the method 500 returns to block 505, where the AP continues to interact with the AR/VR device using the default transmission parameters.

Figure 6:
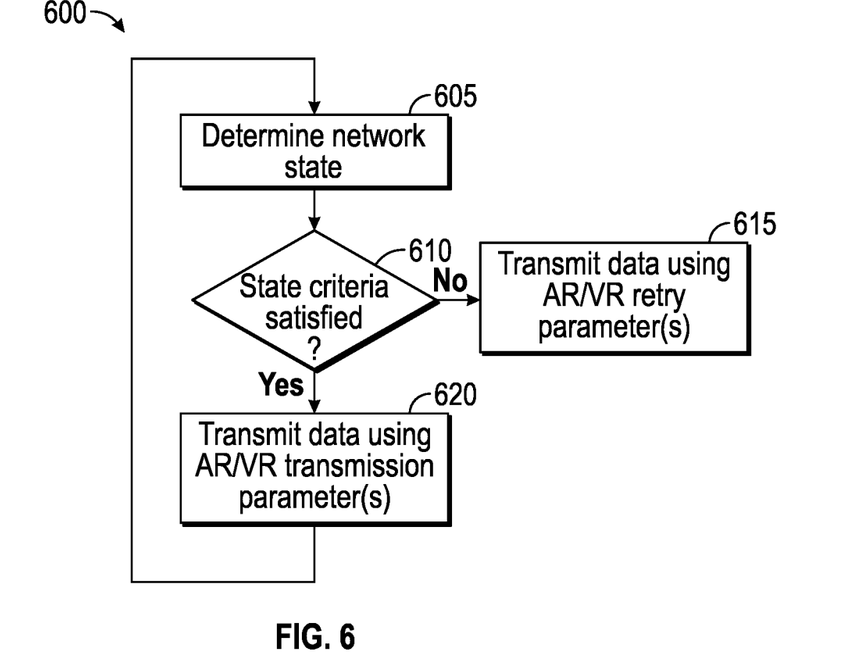
FIG. 6 is a flow diagram depicting a method for proactively improving wireless reliability and robustness based on network state, according to some embodiments disclosed herein.

FIG. 6 is a flow diagram depicting a method 600 for proactively improving wireless reliability and robustness based on network state, according to some embodiments disclosed herein. In some embodiments, the method 500 provides additional detail for block 225 of FIG. 2.

The method 600 begins at block 605, where an AP (e.g., the AP 105 in FIG. 1) determines the current state of the network. In some embodiments, this includes evaluating the current load on the network. For example, quality of service (QOS) basic service set (QBSS) information may be collected and evaluated to determine the number of clients currently connected to the AP, the channel utilization of one or more channels for the AP, and the like.

At block 610, the AP determines whether the current network state satisfies one or more defined criteria. Generally, the state criteria are used to evaluate whether the current network state allows for use of the enhanced transmission parameters for all transmissions (rather than only for retries) to AR/VR devices. For example, the AP may confirm whether the number of associated clients and/or the current channel utilization for the AP is below some threshold value(s). As discussed above, though these enhanced parameters can improve reliability, they may reduce bandwidth and throughput.

If the criteria are not satisfied, the AP may determine that there is insufficient availability in the network to use the enhanced parameters (which, as discussed above, may reduce bandwidth to the AR/VR devices), and the method 600 continues to block 615. At block 615, the AP transmits data to the AR/VR device(s) using the AR/VR retry parameters. That is, the AP uses default transmission parameters for stable transmissions, but uses the enhanced and more robust parameters for any retries. The method 600 then returns to block 605 to reevaluate the state of the network at some future time (e.g., periodically).

If, at block 610, the AP determines that the network state satisfies the criteria, the method 600 continues to block 620. That is, if the AP determines that the current network load is sufficiently low, such that using the more robust parameters will not harm connectivity to the AR/VR device and/or other devices, the method 600 continues to block 620. At block 620, the AP transmit data to the AR/VR device(s) using the enhanced and more robust AR/VR transmission parameters for all transmissions (including ordinary transmissions and retries), regardless of whether any transmission failures have occurred. This may allow the AP to proactively avoid transmission failures.

Figure 7:
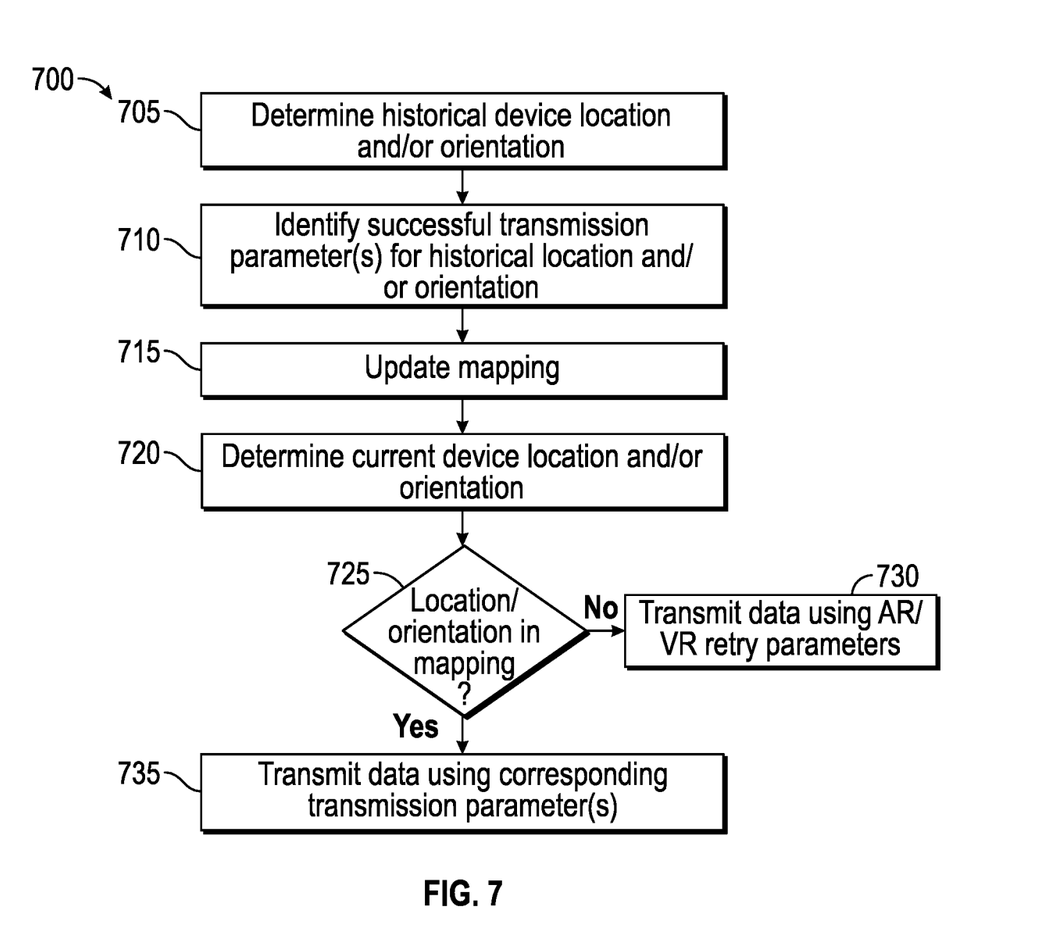
FIG. 7 is a flow diagram depicting a method for proactively improving wireless reliability and robustness using parameter mappings, according to some embodiments disclosed herein.

FIG. 7 is a flow diagram depicting a method 700 for proactively improving wireless reliability and robustness using parameter mappings, according to some embodiments disclosed herein. In some embodiments, the method 500 provides additional detail for block 225 of FIG. 2.

The method 700 begins at block 705, where an AP (e.g., the AP 105 of FIG. 1) determines historical location and/or orientation information for an AR/VR device (e.g., the AR/VR device 120 of FIG. 1) at one or more prior points in time. For example, in one such embodiment, the AR/VR device may transmit its location, orientation, and/or motion information to the AP directly. In some embodiments, this information is instead transmitted, from the AR/VR device, to a computer or server that uses the motion data to render the next frame(s) for the device. In one such embodiment, this computer can transmit the location and/or orientation information to the AP.

At block 710, the AP identifies a set of transmission parameters that were used to successfully transmit data to the AR/VR device at the time corresponding to the historical location and/or orientation information. That is, for the time(s) when the AR/VR device was in the indicated position and/or orientation, the AP can determine the set of transmission parameters that were being used to transmit data to the AR/VR device. If these transmission parameters led to successful transmission at the prior time, they may be successful again if the AR/VR device returns to the same (or a similar) location and/or orientation.

At block 715, the AP updates a mapping between the historical location and/or orientation information and the identified transmission parameters. This mapping may be used during subsequent transmissions.

At block 720, the AP determines the current location and/or orientation of the AR/VR device. As discussed above, this may include receiving the information directly from the AR/VR device, and/or receiving the information from a second device (e.g., a computer or server) which the AR/VR device transmitted it to.

The method 700 then continues to block 725, where the AP determines whether the current location and/or orientation are reflected in the mappings. In some embodiments, this includes determining whether a sufficiently close location and/or orientation (e.g., within a defined distance and/or angular offset) are reflected in the mappings. If no mapping is found, this may indicate that either the AR/VR device is in a new location or orientation that the AP has not seen before, or that the AP did not find a set of transmission parameters that enabled successful transmission to the device in this location or orientation.

If no mapping exists, the method 700 continues to block 730, where the AP transmits data to the AR/VR device using the enhanced retry parameters (using ordinary transmission parameters, in some aspects), as discussed above.

If, at block 725, the AP determines that a mapping exists, the method 700 continues to block 735. At block 735, the AP can retrieve and use the corresponding transmission parameters that enabled successful transmission at the prior time. Advantageously, this can allow the AP to proactively use tailored transmission parameters to increase the likelihood of transmission success, thereby preventing or reducing retries and transmission failures.

Figure 8:
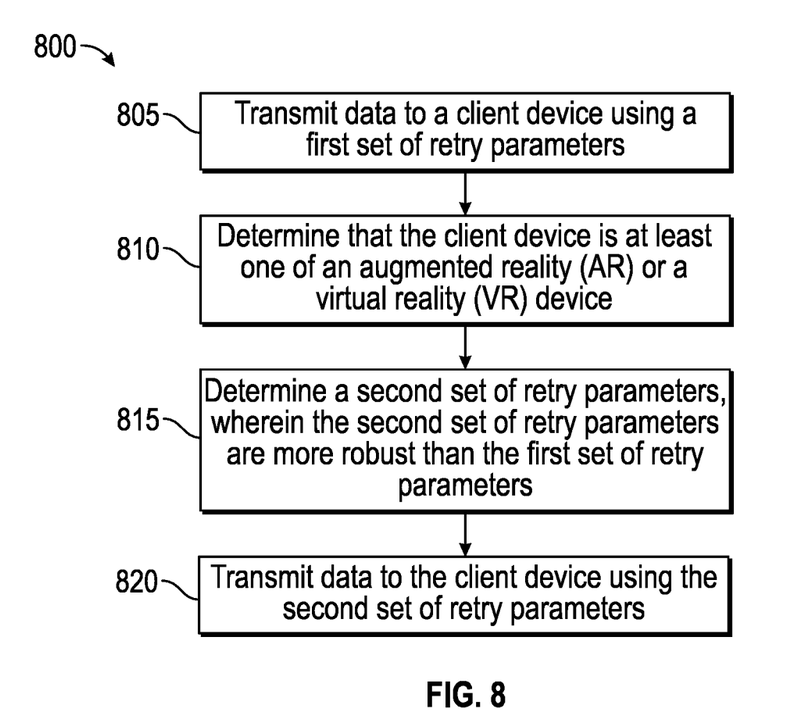
FIG. 8 is a flow diagram depicting a method for improved wireless reliability using retry parameters, according to some embodiments disclosed herein.

FIG. 8 is a flow diagram depicting a method 800 for improved wireless reliability using retry parameters, according to some embodiments disclosed herein.

At block 805, an AP (e.g., AP 105 of FIG. 1) transmits data to a client device using a first set of retry parameters. For example, the AP may use ordinary or default parameters for the data transmission.

At block 810, the AP determines that the client device is an AR/VR device. For example, using the method 400 of FIG. 4, the AP may classify the connected device as an AR/VR device.

At block 815, the AP determines a second set of retry parameters, wherein the second set of retry parameters are more robust than the first set of retry parameters. For example, the AP may use the method 300 of FIG. 3 to determine a set of enhanced retry parameters.

At block 820, the AP transmits data to the client device using the second set of retry parameters. This may correspond, for example, to block 225 in FIG. 2.

Figure 9:
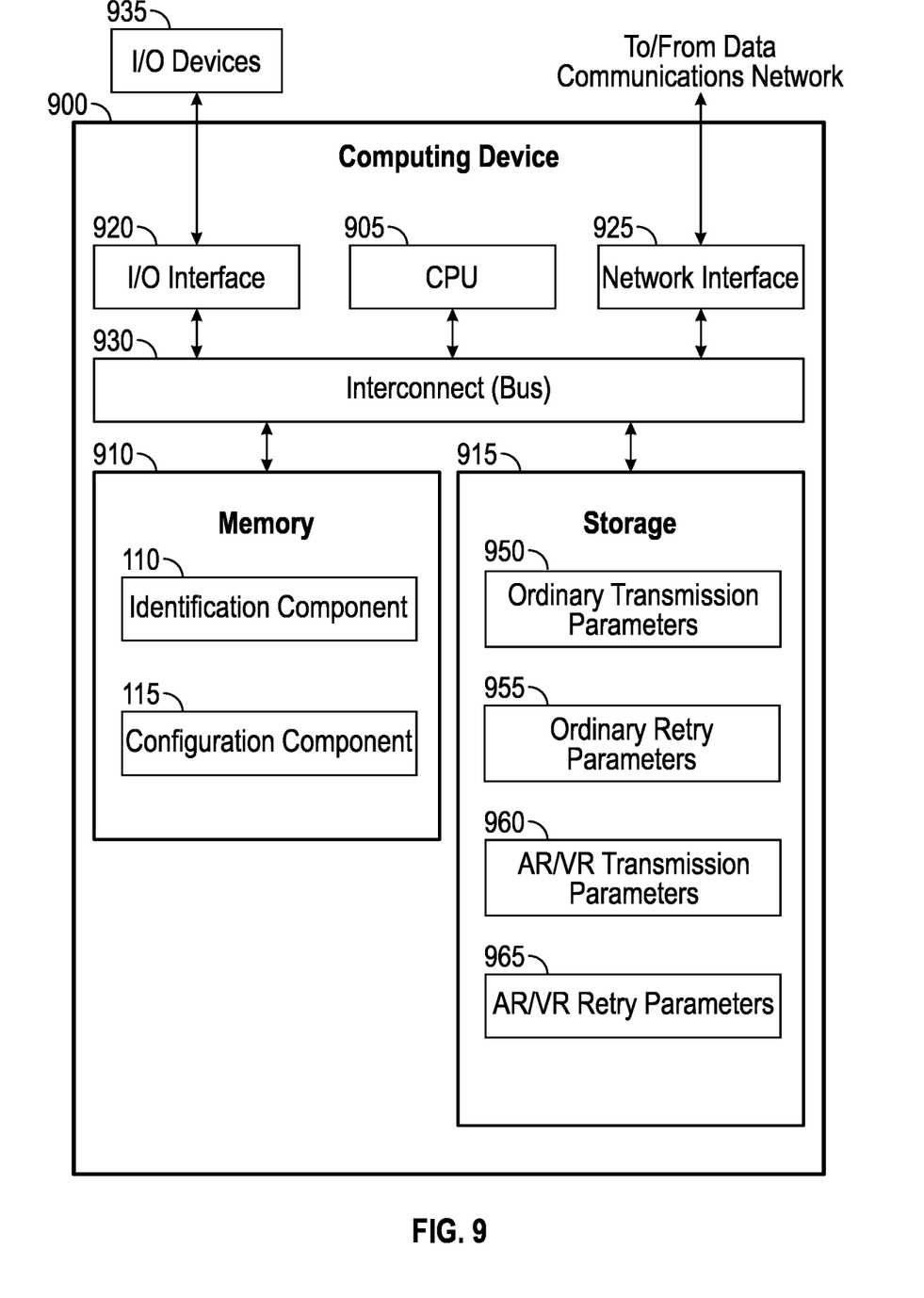
FIG. 9 is a block diagram depicting a computing device configured to provide improved wireless reliability, according to some embodiments disclosed herein.

FIG. 9 is a block diagram depicting a computing device 900 configured to provide improved wireless reliability, according to some embodiments disclosed herein.

Although depicted as a physical device, in embodiments, the computing device 900 may be implemented using virtual device(s), and/or across a number of devices (e.g., in a cloud environment). In one embodiment, the computing device 900 corresponds to the AP 105 in FIG. 1. In another embodiment, the computing device 900 corresponds to a wireless controller.

As illustrated, the computing device 900 includes a CPU 905, memory 910, storage 915, a network interface 925, and one or more I/O interfaces 920. In the illustrated embodiment, the CPU 905 retrieves and executes programming instructions stored in memory 910, as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included to be representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 935 (such as keyboards, monitors, etc.) are connected via the I/O interface(s) 920. Further, via the network interface 925, the computing device 900 can be communicatively coupled with one or more other devices and components (e.g., via a network, which may include the Internet, local network(s), and the like). As illustrated, the CPU 905, memory 910, storage 915, network interface(s) 925, and I/O interface(s) 920 are communicatively coupled by one or more buses 930.

In the illustrated embodiment, the memory 910 includes an identification component 110, and a configuration component 115, each discussed above with reference to FIG. 1, which may be configured to perform one or more embodiments discussed above. Although depicted as discrete components for conceptual clarity, in embodiments, the operations of the depicted components (and others not illustrated) may be combined or distributed across any number of components. Further, although depicted as software residing in memory 910, in embodiments, the operations of the depicted components (and others not illustrated) may be implemented using hardware, software, or a combination of hardware and software.

In the illustrated example, the storage 915 includes a set of ordinary transmission parameters 950, ordinary retry parameters 955, AR/VR-specific transmission parameters 960, and AR/VR-specific retry parameters 965. Generally, the AR/VR transmission parameters 960 and retry parameters 965 may include more robust parameters that can enable increased wireless reliability (e.g., a lower likelihood of transmission failure), as compared to the ordinary transmission parameters 950 and retry parameters 955.

In some embodiments, as discussed above, the computing device 900 can use the ordinary transmission parameters 950 and ordinary retry parameters 955 for data transmission with typical devices, while the AR/VR-specific transmission parameters 960 and AR/VR-specific retry parameters 965 can be used for transmissions with AR/VR devices. In some embodiments, the computing device 900 proactively uses the AR/VR-specific transmission parameters 960 for AR/VR devices, even in the absence of transmission failures (e.g., if the network load is below a defined threshold). The AR/VR-specific retry parameters 965 may be used when retransmission is needed. In other embodiments, the computing device 900 may use the ordinary transmission parameters 950 for AR/VR devices when no transmission failures are occurring, and use the AR/VR-specific retry parameters 965 for any retransmissions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    transmitting data to a client device using a first set of retry parameters;
    determining that the client device is at least one of an augmented reality (AR) or a virtual reality (VR) device;
    determining a second set of retry parameters, wherein the second set of retry parameters are more robust than the first set of retry parameters; and
    transmitting data to the client device using the second set of retry parameters.

2. The method of claim 1, wherein the second set of retry parameters are more robust than the first set of retry parameters because they result in increased transmission robustness and wireless reliability, as compared to the first set of retry parameters.

3. The method of claim 2, wherein the first set of retry parameters comprise:
    a first modulation and coding scheme (MCS) index value for a first retry that is less than a second MCS index value for the first retry of the second set of retry parameters, and
    a first number of spatial streams for the first retry that is greater than a second number of spatial streams for the first retry of the second set of retry parameters.

4. The method of claim 1, wherein the second set of retry parameters comprise:
    disabling single user multiple input multiple output (SU-MIMO) techniques, and
    enabling at least one of space-time block coding (STBC) techniques or dual carrier modulation (DCM) techniques.

5. The method of claim 1, wherein the first set of retry parameters comprise:
    a first maximum number of retries that is greater than a second maximum number of retries of the second set of retry parameters.

6. The method of claim 1, further comprising:
    upon determining that a data transmission to the client device failed, initiating a network sounding prior to attempting one or more retransmissions.

7. The method of claim 1, wherein, prior to determining that a data transmission to the client device failed, data is transmitted to the client device using default transmission parameters.

8. The method of claim 1, wherein, upon determining that network congestion is below a predefined level, all data is transmitted to the client device using one or more of the second set of retry parameters regardless of whether any data transmissions have failed.

9. The method of claim 1, further comprising:
    receiving first information comprising at least one of location information or orientation information from the client device;
    determining a first set of transmission parameters that resulted in a successful data transmission to the client device; and
    mapping the received first information to the first set of transmission parameters.

10. The method of claim 9, further comprising:
    receiving second information comprising at least one of location information or orientation information from the client device;
    determining a second set of transmission parameters that resulted in a successful data transmission to the client device based on the mapping; and
    using the second set of transmission parameters to transmit data to the client device.

11. A computer product comprising logic encoded in a non-transitory medium, the logic executable by operation of one or more computer processors to perform an operation comprising:
    transmitting data to a client device using a first set of retry parameters;
    determining that the client device is at least one of an augmented reality (AR) or a virtual reality (VR) device;
    determining a second set of retry parameters, wherein the second set of retry parameters are more robust than the first set of retry parameters; and
    transmitting data to the client device using the second set of retry parameters.

12. The computer product of claim 11, wherein the first set of retry parameters comprise:
    a first modulation and coding scheme (MCS) index value for a first retry that is less than a second MCS index value for the first retry of the second set of retry parameters, and
    a first number of spatial streams for the first retry that is greater than a second number of spatial streams for the first retry of the second set of retry parameters.

13. The computer product of claim 11, wherein the first set of retry parameters comprise:
    a first maximum number of retries that is greater than a second maximum number of retries of the second set of retry parameters.

14. The computer product of claim 11, wherein, prior to determining that a data transmission to the client device failed, data is transmitted to the client device using default transmission parameters.

15. The computer product of claim 11, wherein, upon determining that network congestion is below a predefined level, all data is transmitted to the client device using one or more of the second set of retry parameters regardless of whether any data transmissions have failed.

16. A system comprising:
one or more computer processors; and
logic encoded in a non-transitory medium, the logic executable by operation of the one or more computer processors to perform an operation comprising:
transmitting data to a client device using a first set of retry parameters;
determining that the client device is at least one of an augmented reality (AR) or a virtual reality (VR) device;
determining a second set of retry parameters, wherein the second set of retry parameters are more robust than the first set of retry parameters; and
transmitting data to the client device using the second set of retry parameters.

17. The system of claim 16, wherein the first set of retry parameters comprise:
a first modulation and coding scheme (MCS) index value for a first retry that is less than a second MCS index value for the first retry of the second set of retry parameters, and
a first number of spatial streams for the first retry that is greater than a second number of spatial streams for the first retry of the second set of retry parameters.

18. The system of claim 16, wherein the first set of retry parameters comprise:
a first maximum number of retries that is greater than a second maximum number of retries of the second set of retry parameters.

19. The system of claim 16, wherein, prior to determining that a data transmission to the client device failed, data is transmitted to the client device using default transmission parameters.

20. The system of claim 16, wherein, upon determining that network congestion is below a predefined level, all data is transmitted to the client device using one or more of the second set of retry parameters regardless of whether any data transmissions have failed.

* * * * *